PERKINS & CRANDALL.
Corn Husker.

No. 90,574.                                    Patented May 25, 1869.

Witnesses
J. H. Shumway
A. J. Tibbits

Inventors
O. S. Perkins
E. R. Crandall
John E. Earle

United States Patent Office.

O. S. PERKINS AND L. A. CRANDALL, OF NEW HAVEN, CONNECTICUT

Letters Patent No. 90,574, dated May 25, 1869.

IMPROVEMENT IN CORN-HUSKER.

The Schedule referred to in these Letters Patent and making part of the same.

*To all whom it may concern:*

Be it known that we, O. S. PERKINS and L. A. CRANDALL, of New Haven, in the county of New Haven, and State of Connecticut, have invented a new Improvement in Corn-Husker; and we do hereby declare the following, when taken in connection with the accompanying drawings, and the letters of reference marked thereon, to be a full, clear, and exact description of the same, and which said drawings constitute part of this specification, and represent, in—

Figure 1:
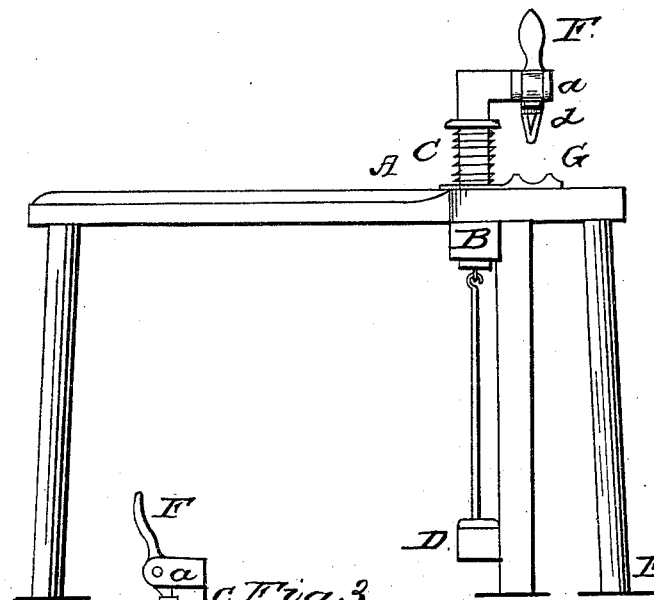
Figure 3:
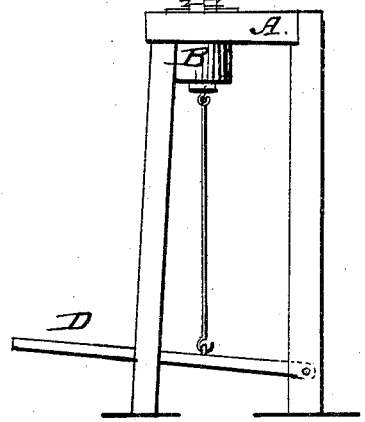
Figure 2:
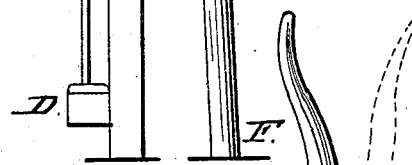

Figure 1, a side view;
Figure 2, a top view;
Figure 3, a front view; and in
Figure 4, a detached view, to illustrate the operation.

The object of this invention is the construction of a machine to facilitate the process of husking corn; and consists in the arrangement, upon a vertical slide, of a fixed cutter, which is forced down to cut the ear from the stalk, and having combined therewith a lever, which enters with the cutter directly at the end of the ear, and when so entered a pressure upon the upper end of the lever forces the ear of corn from the husks, the stem and husks being held by the cutter.

To enable others to construct and use our invention, we will proceed to describe the same as illustrated in the accompanying drawings.

A is a bench, constructed so as to form a seat for the operator.

Arranged in suitable bearings B on the said bench, is a vertical slide, C, having upon its upper end an arm, extending out, to which a cutter, $d$, is firmly fixed.

Figure 4:
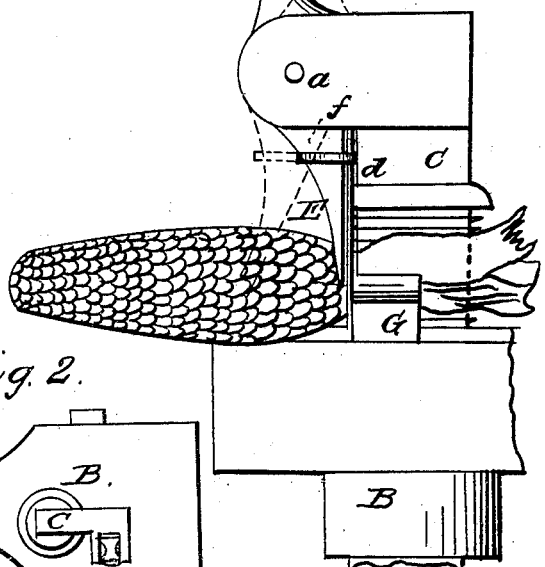

The said slide is operated to move vertically downward, toward the bench, by a treadle, D, as denoted in fig. 4.

In immediate connection with the cutter is arranged a lever, pivoted at $a$, the lower end pivoted as at E, fig. 4, the upper end forming a handle, F.

A spring is applied to the slide, to force it upward, and a suitable spring also applied to the lever, to hold it against the cutter, as denoted in the several figures.

A simple arrangement of the spring is by placing a rubber band, $f$, around the knife and lever, or any other suitable arrangement.

Upon the bench is formed a seat, or block, G, upon which the stalk is placed, as seen in fig. 4, the ear projecting outward. Then the cutter, with the lever, is forced downward, severing the ear from the stalk. Then the operator strikes the handle F a blow sufficient to throw the ear of corn from the bench, separating it from the husks and stalks; then, permitting the cutter to rise, by relieving the depression on the treadle, a second ear is placed and husked in like manner, and so on.

We do not wish to be understood as broadly claiming an arrangement for cutting and ejecting the ear from the stalk and husks, as such we are aware is not new, as the same may be seen in the patent of J. C. Clapp, June 7, 1859; but What we do claim as our invention, and desire to secure by Letters Patent, is—

The vertical slide C, cutter $d$, lever E, with its handle F, in combination with the block G and treadle D, the whole constructed and arranged so as to operate substantially as and for the purpose specified.

O. S. PERKINS.
L. A. CRANDALL.

Witnesses:
A. J. TIBBITS,
J. H. SHUMWAY.